No. 883,248. PATENTED MAR. 31, 1908.
R. SIEGFRIED.
SUPPORTING STRUCTURE FOR DYNAMO ELECTRIC MACHINES.
APPLICATION FILED MAR. 3, 1906.
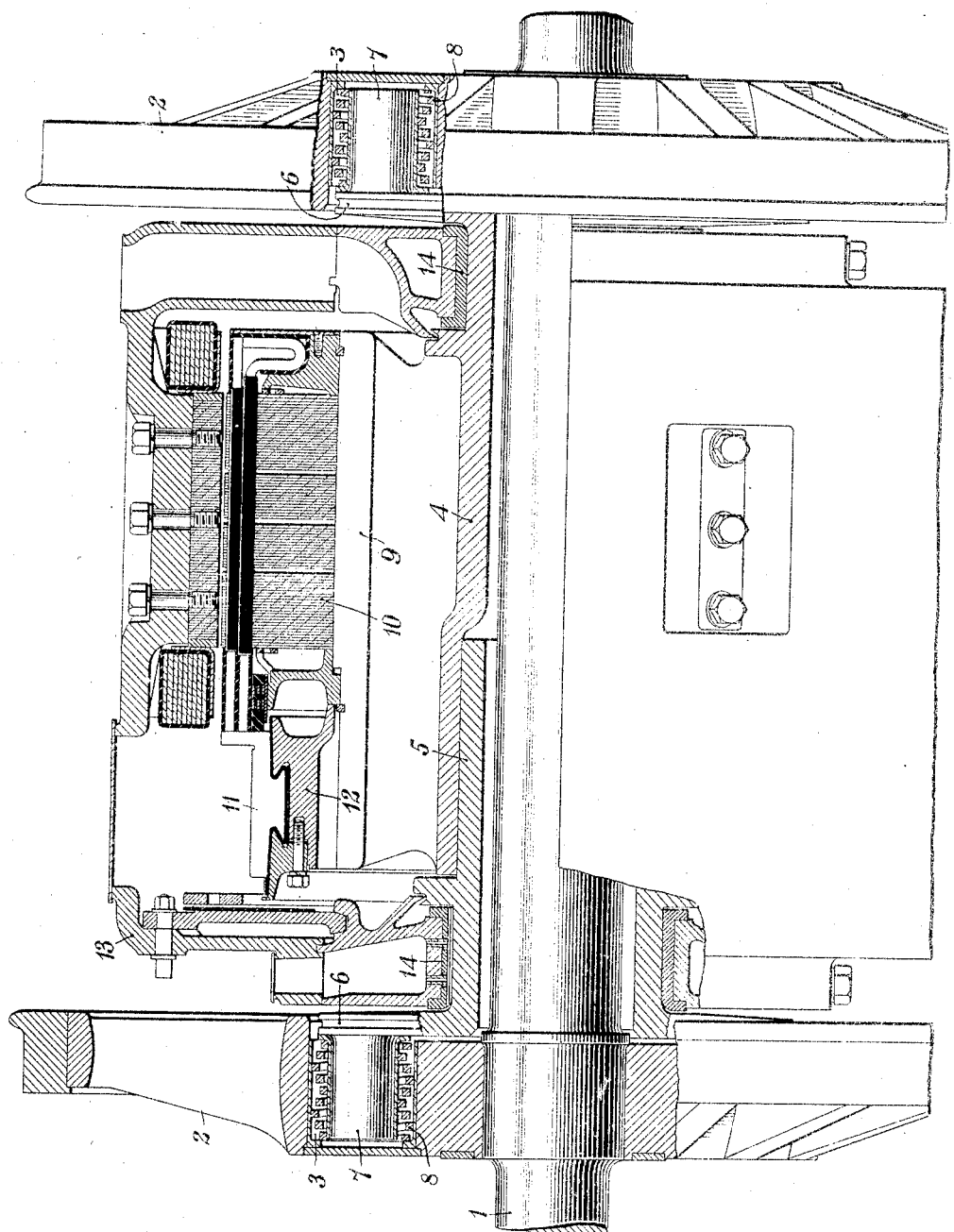
WITNESSES:
C. L. Belcher
Otto S. Schairer
INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

SUPPORTING STRUCTURE FOR DYNAMO-ELECTRIC MACHINES.

No. 883,248.     Specification of Letters Patent.     Patented March 31, 1908.

Application filed March 3, 1906. Serial No. 304,091.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Supporting Structures for Dynamo-Electric Machines, of which the following is a specification.

My invention relates to dynamo-electric machines and particularly to motors that are mounted upon and directly surround the driving axles of locomotives or other vehicles.

The object of my invention is to provide a novel and improved supporting structure for such motors.

Electric motors that are employed for the propulsion of locomotives and other vehicles are frequently mounted upon quills or sleeves that surround the driving axles and that are directly and resiliently connected thereto or to the driving wheels, the motors thus applied being, in general, adapted for slower speeds of operation than the more usual forms that are connected to the driving axles by means of speed-reducing gearing. The quills or sleeves heretofore employed in such relations have usually been provided with radial arms or annular flanges at one end only and resilient or other connections have been interposed between the same and the driving wheels, and such structures have generally permitted of convenient assembling of the parts of the rotatable members upon the quills or sleeves. However, when large and powerful motors are to be mounted in this manner it will generally be found desirable to connect both ends of the quills to the adjacent driving wheels, and in another application, Serial No. 304,089, filed of even date herewith, I have set forth a structure in which both ends of the quills are provided with radial arms or flanges that may be resiliently or otherwise connected to the driving wheels.

The magnetizable cores of the rotatable members of such dynamo-electric machines are usually and preferably composed of annular punchings or laminæ that are mounted upon supporting structures carried by the quills, and the commutator cylinders are frequently assembled upon sleeves that may also be mounted upon the supporting structures. In order to permit of ready application of the punchings and sleeves to the supporting structures, especially when the inner diameters thereof are smaller than the outer diameters of the radial arms or flanges of the quills, I propose to provide a two-part quill structure and to form the supporting structure for the magnetizable core and the commutator cylinder integral with one of the parts or to rigidly attach it thereto. When so constructed and arranged, the armature may be completely assembled upon the supporting structure before the other section of the quill is applied thereto and, consequently, it is immaterial whether the inner diameters of the core punchings and of the commutator cylinder are greater or less than the outer diameters of the radial arms or flanges.

In the application above referred to, I have shown specifically a two-part quill structure, both parts of which are separable from the supporting structure for the armature. In still another application, Serial No. 304,090, filed of even date herewith, the quill and the supporting srtucture for the armature are formed in one piece and the inner diameter of the core punchings and that of the sleeve that carries the commutator cylinder are equal to or slightly greater than the outer diameters of the radial arms or flanges of the quills.

The single figure of the accompanying drawing is a view, partially in transverse section, and partially in elevation of a motor, and of the driving wheels of a vehicle that embody my invention.

Mounted upon opposite ends of an axle 1, that may be the driving axle of a locomotive or other vehicle, are wheels 2 each of which is provided with a set of annularly arranged chambers 3. Loosely surrounding the axle 1, between the driving wheels 2 is a quill or sleeve that comprises two parts 4 and 5, the outer ends of which are provided with annular flanges or radial arms 6, from which bosses 7 project into the wheel chambers 3. The bosses are surrounded within the chambers by resilient cushioning means, such, for example, as specially constructed helical springs 8 that form the subject-matter of an application, Serial No. 294,410, filed by me January 3, 1906. Formed integral with or rigidly fastened to the portion 4 of the quill is a spider or supporting structure 9 for a magnetizable core 10 that is composed of annular punchings, as is usual in machines of this class, and for a commutator cylinder 11 the segments of which are assembled and secured upon a separate sleeve 12. The stationary member 13 of the motor, which, in this case, is the field magnet structure, is supported by means of bearings 14 that surround the portions of the quill sections that are located near the radial arms or flanges 6, relative rotation between the parts being thereby permitted.

In assembling the parts of the rotatable member, the core punchings and the sleeve 12 for the commutator cylinder may be first applied to the spider or supporting structure 9 and then the small cylindrical end of the section 5 of the quill may be inserted into the free end of the quill section 4. Thus it is seen that the core punchings and the commutator cylinder may be readily applied to the supporting structure regardless of whether the inner diameters thereof are greater or less than the outer diameters of the radial arms or flanges 6.

While the invention has been shown and described as applied to dynamo-electric machines of the direct current type, it will be readily understood that it is equally applicable to alternating current machines or to other machines that may be similarly mounted, and the details of construction and arrangement may obviously be varied considerably from what has been shown and described without departing from the spirit of the invention.

I claim as my invention:

1. The combination with an axle and wheels mounted thereon, of a dynamo-electric machine located between the wheels and comprising a rotatable, magnetizable core, a supporting structure for the magnetizable core that loosely surrounds the axle and is provided with an extension having a flange or radial arms greater in external diameter than the internal diameter of the magnetizable core, and a sleeve that surrounds the axle at the other end of the machine and projects into the supporting structure and is also provided with a flange or radial arms.

2. The combination with an axle and wheels mounted thereon, of a dynamo-electric machine located between the wheels and comprising a rotatable, magnetizable core, a supporting structure for the magnetizable core that loosely surrounds the axle and is provided with an extension having a flange or radial arms, and a sleeve that surrounds the axle at the other end of the machine and projects into the supporting structure and is also provided with a flange or radial arms.

3. The combination with an axle and wheels mounted thereon having annular sets of chambers, of a dynamo-electric machine located between the wheels and comprising a rotatable, magnetizable core, a removable commutator cylinder and a supporting structure therefor that loosely surrounds the axle and is provided with an extension having a flange or radial arms and with bosses which project therefrom into the wheel chambers, a sleeve that surrounds the axle at the other end of the machine and projects into the supporting structure and is also provided with a flange or radial arms and with bosses that project into the wheel chambers, and resilient cushioning means that surround the bosses within the chambers.

4. The combination with an axle and wheels mounted thereon having annular sets of chambers, of a dynamo-electric machine located between the wheels and comprising a rotatable, magnetizable core and a supporting structure therefor that loosely surrounds the axle and is provided with a flange or radial arms having bosses that project into the wheel chambers, a sleeve that surrounds the axle at the other end of the machine and projects into the supporting structure and is also provided with a flange or radial arms having bosses that project into the wheel chambers, and resilient cushioning means that surround the bosses within the chambers.

5. The combination with an axle and wheels mounted thereon, of a dynamo-electric machine located between the wheels and comprising a rotatable, magnetizable core, a removable commutator cylinder and a supporting structure therefor that loosely surrounds the axle and is provided with an extension having a flange or radial arms greater in external diameter than the internal diameter of the magnetizable core and that of the commutator cylinder, and a sleeve that surrounds the axle at the other end of the machine and projects into the supporting structure and is also provided with a flange or radial arms.

6. The combination with an axle and wheels mounted thereon, of a dynamo-electric machine located between the wheels and comprising a rotatable, magnetizable core, a supporting structure therefor and a quill that surrounds the axle and projects into the supporting structure, and resilient means for connecting the supporting structure and the quill to the wheels.

7. The combination with a dynamo-electric machine comprising a rotatable, magnetizable core, of a supporting structure therefor provided with an extension having a flange or radial arms greater in diameter than the internal diameter of the magnetizable core, and a sleeve that projects into and forms a part of the supporting structure and is also provided, at its outer end, with a flange or radial arms.

8. The combination with a dynamo-electric machine comprising a rotatable, magnetizable core, of a supporting structure therefor provided with an extension having a flange or radial arms, and a sleeve that projects into and forms a part of the supporting structure and is also provided, at its outer end, with a flange or radial arms.

9. The combination with a dynamo-electric machine comprising a rotatable, magnetizable core and a removable commutator cylinder, of a supporting structure therefor provided with an extension having a flange or radial arms greater in external diameter than the internal diameter of the magnetizable core and that of the commutator cylinder, and a sleeve that projects into and forms a part of the supporting structure and is also provided with a flange or radial arms.

In testimony whereof, I have hereunto subscribed my name this 23rd day of February, 1906.

ROBERT SIEGFRIED.

Witnesses:
  OTTO S. SCHAIRER,
  BIRNEY HINES.